US007454026B2

(12) United States Patent
Yamada

(10) Patent No.: US 7,454,026 B2
(45) Date of Patent: Nov. 18, 2008

(54) AUDIO IMAGE SIGNAL PROCESSING AND REPRODUCTION METHOD AND APPARATUS WITH HEAD ANGLE DETECTION

(75) Inventor: Yuji Yamada, Tokyo (JP)

(73) Assignee: Sony Corporation (JP)

( * ) Notice: Subject to any disclaimer, the term of this patent is extended or adjusted under 35 U.S.C. 154(b) by 254 days.

(21) Appl. No.: 10/252,969

(22) Filed: Sep. 23, 2002

(65) Prior Publication Data

US 2003/0076973 A1 Apr. 24, 2003

(30) Foreign Application Priority Data

Sep. 28, 2001 (JP) .......................... P2001-299283

(51) Int. Cl.
*H04R 5/02* (2006.01)
*H04R 5/00* (2006.01)
*G06F 17/00* (2006.01)

(52) U.S. Cl. ........................ 381/310; 381/309; 381/17; 381/18; 700/94

(58) Field of Classification Search ..................... 381/1, 381/17, 310, 26, 309, 74, 18, 110, 94, 119; 700/94

See application file for complete search history.

(56) References Cited

U.S. PATENT DOCUMENTS 3,970,787 A * 7/1976 Searle ........................ 381/310
4,143,244 A * 3/1979 Iwahara et al. .............. 381/310
4,524,451 A * 6/1985 Watanabe ...................... 381/1
5,495,534 A * 2/1996 Inanaga et al. .............. 381/310
6,021,205 A * 2/2000 Yamada et al. .............. 381/310
6,973,184 B1 * 12/2005 Shaffer et al. .......... 379/420.01
2002/0025054 A1 * 2/2002 Yamada et al. .............. 381/310
2003/0210800 A1 * 11/2003 Yamada et al. .............. 381/310
2004/0196991 A1 * 10/2004 Iida et al. .................... 381/309

* cited by examiner

*Primary Examiner*—Vivian Chin
*Assistant Examiner*—Douglas Suthers
(74) *Attorney, Agent, or Firm*—Lerner, David, Littenberg, Krumholz & Mentlik, LLP

(57) ABSTRACT

Input digital sound signals are subjected to filtering for convolution of respective impulse responses, and the resulting signals are supplied to time delay setting circuits. In each of the time delay setting circuits, output signals from two adjacent stages of the time delay setting circuits, which correspond to a direction closest to a detected facing direction of a listener, are taken out as two pairs of signals. In crossfade processing circuits, the signals in each pair are added at a proportion depending on the detected facing direction of the listener. Output signals of the crossfade processing circuits are taken out through correction filters for compensating frequency characteristic changes in a high frequency range. As a result, when listening to sound with headphones and localizing a sound image at an arbitrary fixed position outside the listener's head, noises generated upon a change in the facing direction of the listener are reduced.

18 Claims, 14 Drawing Sheets

AUDIO IMAGE SIGNAL PROCESSING AND REPRODUCTION METHOD AND APPARATUS WITH HEAD ANGLE DETECTION

BACKGROUND OF THE INVENTION

1. Field of the Invention

The present invention relates to a sound signal processing method and a sound reproduction apparatus, which are useful when listening to sounds with headphones or earphones and localizing a sound image at an arbitrary fixed position outside the head of a listener, or when listening to sounds with speakers or headphones and localizing a sound image at an arbitrary changeable position around the listener.

2. Description of the Related Art

A sound reproduction system is proposed in which, when listening to sounds with headphones, a sound image is localized at an arbitrary fixed position outside the head of a listener regardless of which direction the listener faces, as if a speaker is disposed at the fixed position.

FIGS. 1A, 1B and 1C show the principle for such sound image localization. As shown in FIG. 1A, a listener 1 wears headphones 3 and listens to sounds with left and right acoustic transducers 3L, 3R of the headphones 3. Then, as shown in FIG. 1B or 1C, a sound image is localized at an arbitrary fixed position, which is denoted by a sound source 5, outside the listener's head regardless of whether the listener 1 faces rightward or leftward.

In that case, it is assumed that HL and HR represent respective Head Related Transfer Functions (HRTF) from the sound source 5 to a left ear 1L and a right ear 1R of the listener 1, and HLc and HRc represent, in particular, respective Head Related Transfer Functions from the sound source 5 to the left ear 1L and the right ear 1R of the listener 1 when the listener 1 faces in a predetermined direction, e.g., in a direction toward the sound source 5. In the following description, the facing direction of the listener 1 is represented by a rotational angle θ with respect to the direction toward the sound source 5.

FIG. 17 shows one example of conventional sound reproduction systems implementing the above-described principle. An angular velocity sensor 9 is attached to the headphones 3, and an output signal of the angular velocity sensor 9 is integrated to detect the rotational angle θ.

In the example of FIG. 17, an input digital sound signal Di corresponding to a signal from the sound source 5 in FIG. 1 is supplied to digital filters 31 and 32. The digital filters 31 and 32 convolute impulse responses corresponding to the Transfer Functions HLc and HRc on the digital sound signal Di, and are constituted as, e.g., FIR (Finite Impulse Response) filters.

Sound signals L1 and R1 outputted from the digital filters 31 and 32 are supplied to a time difference setting circuit 38. Then, sound signals L2 and R2 outputted from the time difference setting circuit 38 are supplied to a level difference setting circuit 39.

When the listener 1 faces rightward as shown in FIG. 1B, the left ear 1L of the listener 1 comes closer to the sound source 5 and the right ear 1R moves farther away from the sound source 5 as the rotational angle θ increases within the range of θ=0 degree to +90 degrees. To fixedly localize a sound image at the position of the sound source 5, therefore, the Transfer Function HL must be changed relative to the Transfer Function HLc such that as the rotational angle θ increases, a resulting time delay is reduced and an output signal level is increased, while the Transfer Function HR must be changed relative to the Transfer Function HRc such that as the rotational angle θ increases, a resulting time delay is increased and an output signal level is reduced.

Conversely, when the listener 1 faces leftward as shown in FIG. 1C, the left ear 1L of the listener 1 moves farther away from the sound source 5 and the right ear 1R comes closer to the sound source 5 as the rotational angle θ increases within the range of θ=0 degree to −90 degrees. To fixedly localize a sound image at the position of the sound source 5, therefore, the Transfer Function HL must be changed relative to the Transfer Function HLc such that as the rotational angle θ increases, a resulting time delay is increased and an output signal level is reduced, while the Transfer Function HR must be changed relative to the Transfer Function HRc such that as the rotational angle θ increases, a resulting time delay is reduced and an output signal level is increased.

In the sound reproduction system of FIG. 17, the time difference between the sound signal listened by the listener's left ear and the sound signal listened by the listener's right ear is set by the time difference setting circuit 38, and the level difference between them is set by the level difference setting circuit 39.

More specifically, the time difference setting circuit 38 comprises time delay setting circuits 51 and 52. In the time delay setting circuits 51 and 52, the sound signals L1 and R1 outputted from the digital filters 31 and 32 are successively delayed by multistage-connected delay circuits 53 and 54. The delay circuits 53 and 54 serve as delay units each providing a delay time for each stage, which is equal to a sampling period τ of the sound signals L1 and R1.

For example, sampling frequency fs of the sound signals L1 and R1 is 44.1 kHz, and therefore the sampling period τ of the sound signals L1 and R1 is about 22.7 μsec. This value corresponds to a change in time delay of the left and right sound signals occurred when the rotational angle of the listener's head is about 3 degrees.

In the time delay setting circuits 51 and 52, output signals from stages of the delay circuits, which correspond to a rotational angle (direction) closest to the detected rotational angle θ, are taken out by respective selectors 55 and 56 as the sound signals L2 and R2 outputted from the time difference setting circuit 38.

For example, when the rotational angle θ is 0 degree, output signals Lt and Rt at the middle stages of the delay circuits are taken out by the selectors 55 and 56, and the time difference between the output sound signals L2 and R2 becomes 0. When the rotational angle θ is +α (i.e., α in the rightward direction, α being about 3 degrees corresponding to τ), a signal Ls advanced τ from the signal Lt is taken out by the selector 55 and a signal Ru delayed τ from the signal Rt is taken out by the selector 56. When the rotational angle θ is −α (i.e., α in the leftward direction), a signal Lu delayed τ from the signal Lt is taken out by the selector 55 and a signal Rs advanced τ from the signal Rt is taken out by the selector 56.

In the level difference setting circuit 39, respective levels of the sound signals L2 and R2 outputted from the time difference setting circuit 38 are set depending on the detected rotational angle θ, whereby the level difference between the sound signals L2 and R2 is set.

Then, digital sound signals L3 and R3 outputted from the level difference setting circuit 39 are converted to analog sound signals by D/A (Digital-to-Analog) converters 41L and 41R. The resulting 2-channel analog sound signals are amplified by sound amplifiers 42L and 42R, and supplied to the left and right acoustic transducers 3L, 3R of the headphones 3, respectively.

FIG. 18 shows another example of the conventional sound reproduction systems. In this example, digital filters 83-0, 83-1, 83-2, . . . , 83-n and digital filters 84-0, 84-1, 84-2, . . . , 84-n are provided to convolute, on an input digital sound signal, impulse responses corresponding to Head Related Transfer Functions HL(θ0), HL(θ1), HL(θ2), . . . , HL(θn) from the sound source 5 to the left ear 1L of the listener 1 in FIG. 1 and Head Related Transfer Functions HR(θ0), HR(θ1), HR(θ2), . . . , HR(θn) from the sound source 5 to the right ear 1R of the listener 1, when the rotational angle θ is θ0, θ1, θ2, . . . , θn, respectively. The rotational angles θ0, θ1, θ2, . . . , θn are set at, for example, equiangular intervals in the circumferential direction about the listener.

Then, an input digital sound signal Di is supplied to the digital filters 83-0, 83-1, 83-2, . . . , 83-n and the digital filters 84-0, 84-1, 84-2, . . . , 84-n. An output signal from one of the digital filters 83-0, 83-1, 83-2, . . . , 83-n, which corresponds to a rotational angle (direction) closest to the detected rotational angle θ, is taken out by a selector 55 as a sound signal to be supplied to the left acoustic transducer 3L of the headphones 3. An output signal from one of the digital filters 84-0, 84-1, 84-2, . . . , 84-n, which corresponds to a rotational angle (direction) closest to the detected rotational angle θ, is taken out by a selector 56 as a sound signal to be supplied to the right acoustic transducer 3R of the headphones 3.

Then, digital sound signals outputted from the selectors 55 and 56 are converted to analog sound signals by D/A converters 41L and 41R. The resulting 2-channel analog sound signals are amplified by sound amplifiers 42L and 42R, and supplied to the left and right acoustic transducers 3L, 3R of the headphones 3, respectively.

In the conventional sound reproduction system shown in FIG. 17, however, the resolution of a time delay in the Head Related Transfer Functions (HRTF) HL and HR from the sound source 5 to the left ear 1L and the right ear 1R of the listener 1 in FIG. 1 is decided by the unit delay time of the delay circuits 53 and 54 in the time delay setting circuits 51 and 52, i.e., by the sampling period τ of the sound signals L1 and R1 outputted from the digital filters 31 and 32. Hence, when the sampling frequency fs of the sound signals L1 and R1 is 44.1 kHz and the sampling period τ is about 22.7 μsec, the resolution of the time delay corresponds to about 3 degrees in terms of the rotational angle of the listener's head.

Therefore, when the facing direction of the listener is not a discrete predetermined direction represented by 0 degree or an integral multiple of ±3 degrees that is decided by the sampling period τ of the sound signals L1 and R1 outputted from the digital filters 31 and 32, but a direction between the discrete predetermined directions, such as ±1.5 or ±4.5 degrees, a sound image cannot be localized at the predetermined position (direction), denoted by the sound source 5 in FIG. 1, precisely corresponding to the facing direction of the listener.

Also, when the listener changes the facing direction, the sound signals L2 and R2 outputted from the time difference setting circuit 38 are momentarily changed over for each unit angle. Hence, waveforms of the sound signals L2 and R2 are changed abruptly and transfer characteristics are also changed abruptly, whereby shock noises are generated.

Similarly, in the conventional sound reproduction system shown in FIG. 18, when the facing direction of the listener is not a discrete predetermined direction, but a direction between the discrete predetermined directions, such as between θ0 and θ1 or between θ1 and θ2, a sound image cannot be localized at the predetermined position (direction) denoted by the sound source 5 in FIG. 1 precisely corresponding to the facing direction of the listener. Also, when the listener changes the facing direction, the sound signals outputted from the selectors 55 and 56 are momentarily changed over for each unit angle. Hence, waveforms of the output sound signals are changed abruptly and transfer characteristics are changed abruptly, whereby shock noises are generated.

SUMMARY OF THE INVENTION

Accordingly, it is an object of the present invention to provide a sound signal processing method and a sound reproduction apparatus with which, when localizing a sound image at an arbitrary fixed position outside the head of a listener, the sound image can be always localized at a predetermined position precisely corresponding to the facing direction of the listener, and shock noises generated upon changes in the facing direction of the listener are reduced, thus resulting in sound signals with good sound quality.

To achieve the above object, according to one aspect of the present invention, there is provided a sound signal processing method comprising the steps of executing signal processing on an input sound signal to localize a sound image of the input sound signal in at least two positions or directions on both sides of a target position or direction; and adding a plurality of sound signals obtained in the signal processing step at a proportion depending on the target position or direction, thereby obtaining an output sound signal.

Also, in the sound signal processing method of the present invention, the output sound signal is preferably obtained after compensating frequency characteristic changes caused on the input sound signal in the adding step.

Further, according to another aspect of the present invention, there is provided a sound signal processing method comprising the steps of filtering an input sound signal to localize a sound image of the input sound signal in a reference position or direction; oversampling each of sound signals obtained in the filtering step at n-time frequency (n is an integer equal to or larger than 2); and adding a time difference between sound signals obtained in the oversampling step depending on a position or direction in which the sound image is to be localized and the reference position or direction, thereby obtaining an output sound signal.

DESCRIPTION OF THE PREFERRED EMBODIMENTS (First Embodiment; FIGS. 1-12)

Figure 1A:
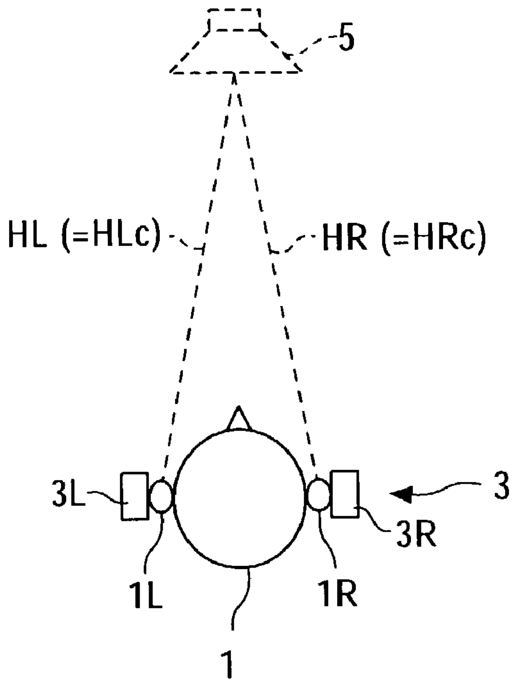
FIGS. 1A, 1B and 1C are illustrations for explaining the principle in localizing a sound image at an arbitrary fixed position outside the head of a listener.
Figure 1B:
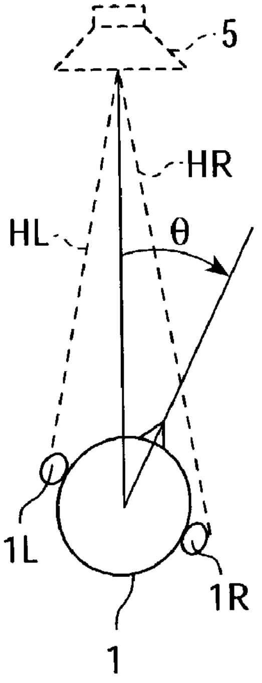
Figure 1C:
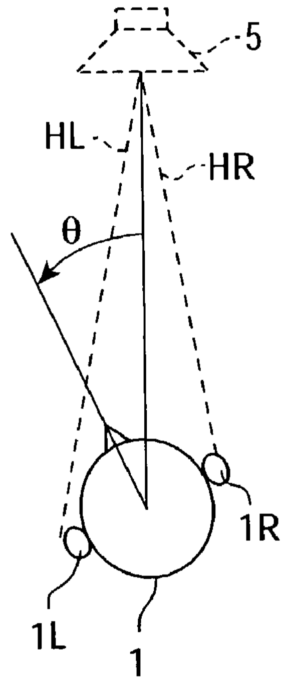
Figure 2:
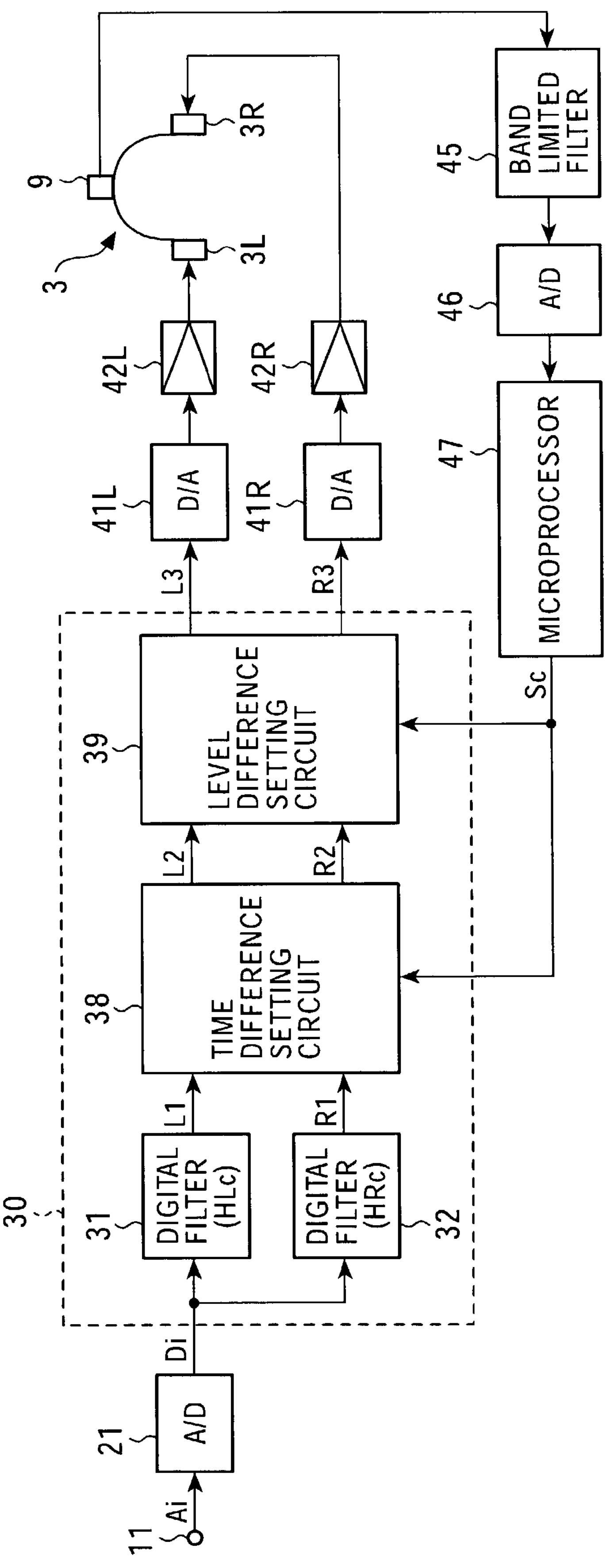
FIG. 2 is a block diagram showing a first embodiment of a sound reproduction system of the present invention.

FIG. 2 shows a first embodiment of a sound reproduction system of the present invention in the case listening to a 1-channel sound signal with headphones as shown in FIG. 1.

An angular velocity sensor 9 is attached to headphones 3. An output signal of the angular velocity sensor 9 is limited in band by a band limited filter 45 and then converted to digital data by an A/D (Analog-to-Digital) converter 46. The resulting digital data is taken into a microprocessor 47 in which the digital data is integrated to detect a rotational angle (direction) θ of the head of a listener wearing the headphones 3.

An input analog sound signal Ai corresponding to a signal from the sound source 5 in FIG. 1 is supplied to a terminal 11 and then converted to a digital sound signal Di by an A/D converter 21. The resulting digital sound signal Di is supplied to a signal processing unit 30.

The signal processing unit 30 comprises digital filters 31, 32, a time difference setting circuit 38, and a level difference setting circuit 39. The functions of these components are realized using a dedicated DSP (Digital Signal Processor) including software (processing program), or in the form of hardware circuits. The signal processing unit 30 supplies the digital sound signal Di from the A/D converter 21 to the digital filters 31 and 32.

Figure 3:
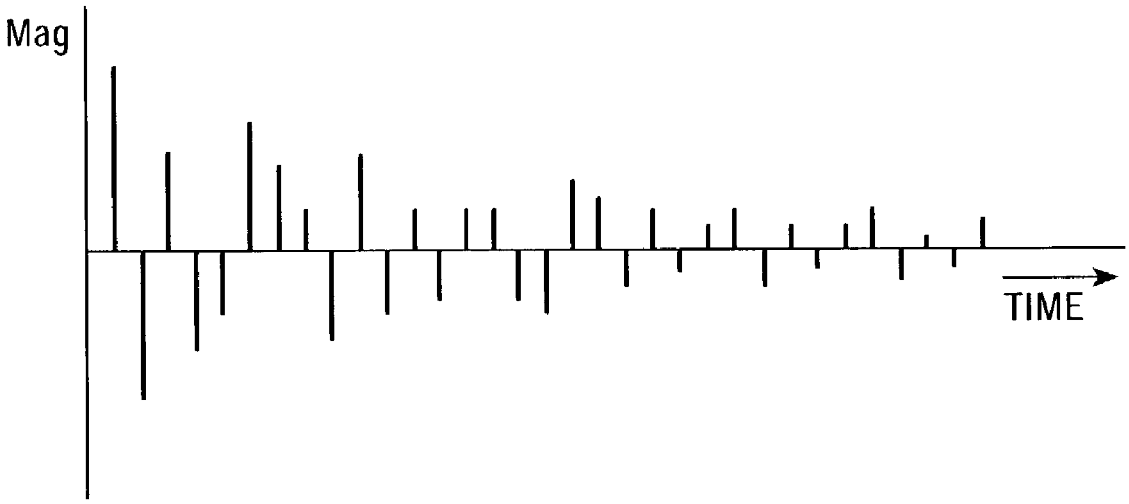
FIG. 3 is a time chart showing one example of impulse responses.
Figure 4:
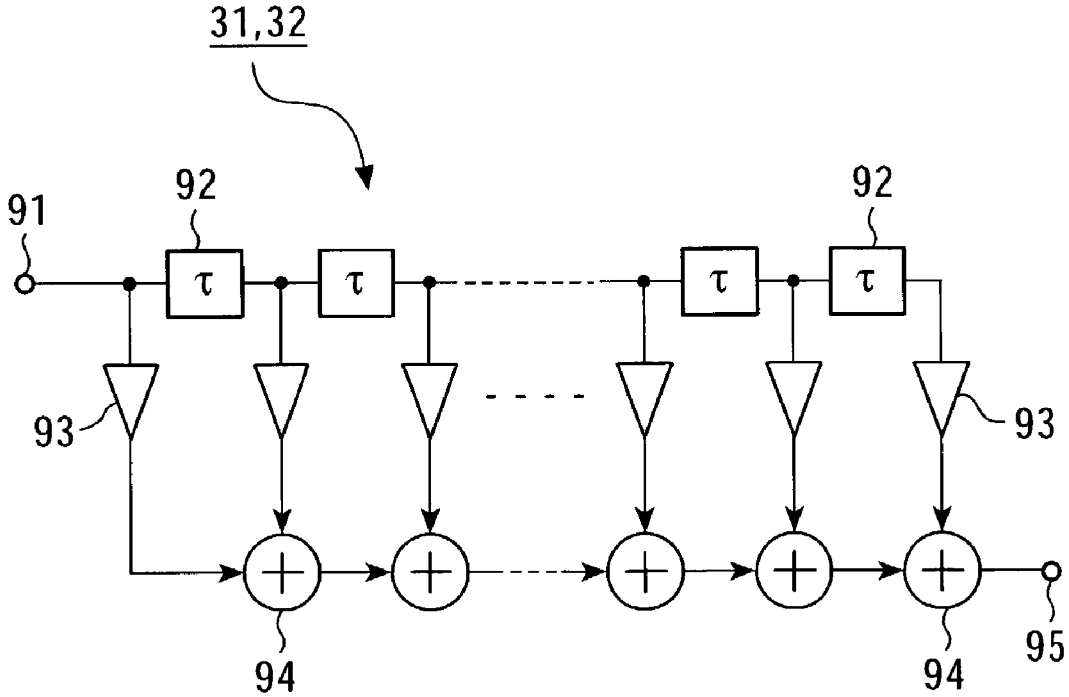
FIG. 4 is a circuit diagram showing one example of a digital filter.

The digital filters 31 and 32 convolute, on the input sound signal, impulse responses which are shown in FIG. 3 and correspond to Head Related Transfer Functions HLc and HRc from the sound source 5 to the left ear 1L and the right ear 1R of the listener 1 in FIG. 1 resulted when the listener faces a predetermined reference direction, e.g., the direction toward the sound source 5 as shown in FIG. 1A. The digital filters 31 and 32 are each constituted as an FIR filter shown, by way of example, in FIG. 4.

More specifically, in each of the digital filters 31 and 32, the sound signal supplied to the input terminal 91 is successively delayed by multistage-connected delay circuits 92. Each multiplier 93 multiplies the sound signal supplied to the input terminal 91 or an output signal of each delay circuit 92 by the coefficient of a corresponding impulse response. Respective output signals of the multipliers 93 are successively added by adders 94, whereby a sound signal after filtering is obtained at an output terminal 95. Each delay circuit 92 serves as a delay unit providing a sampling period τ of the input sound signal as a delay time for each stage.

Sound signals L1 and R1 outputted from the digital filters 31 and 32 are supplied to the time difference setting circuit 38. Then, sound signals L2 and R2 outputted from the time difference setting circuit 38 are supplied to the level difference setting circuit 39.

Figure 5:
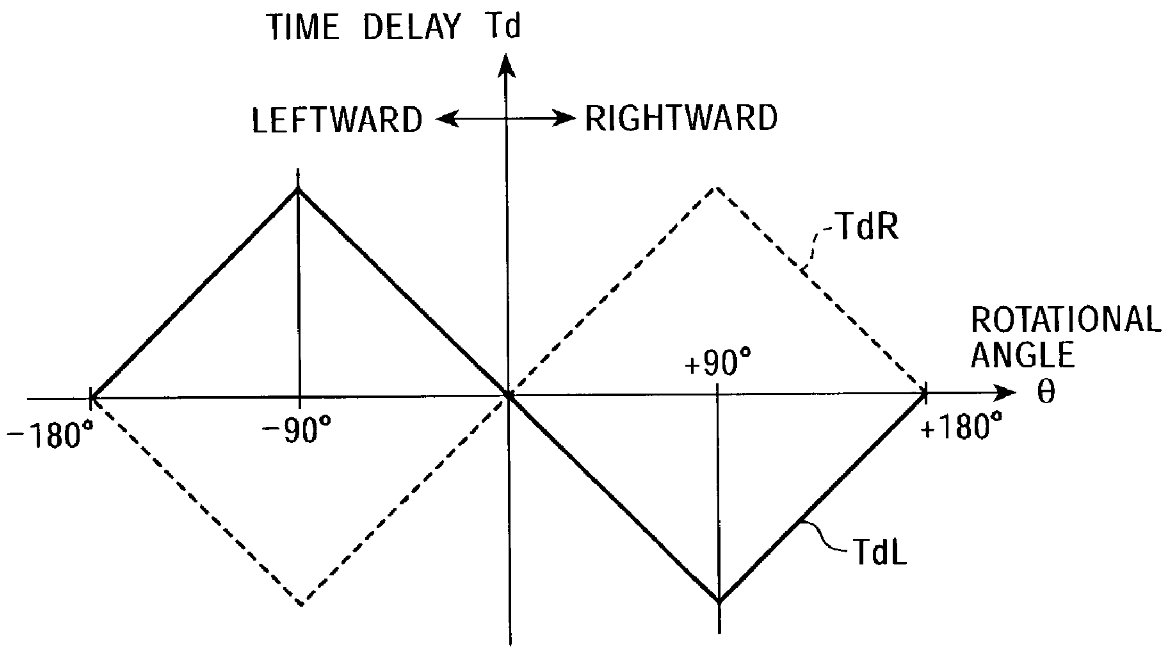
FIG. 5 is a graph showing the relationship between the facing direction of a listener and delays in time reaching both ears of the listener.

To fixedly localize a sound image at the position of the sound source 5 in FIG. 1, time delays in the Transfer Functions HL and HR from the sound source 5 to the left ear 1L and the right ear 1R of the listener 1 must be changed as indicated by a solid line TdL and a broken line TdR in FIG. 5, respectively, depending on the rotational angle θ detected as described above. In other words, signal levels of the Transfer Functions HL and HR must be changed as indicated by a solid line LeL and a broken line LeR in FIG. 6, respectively, depending on the detected rotational angle θ. Incidentally, θ=±180 degrees represents the state in which the listener 1 faces just backward with respect to the sound source 5.

The time difference between the sound signal listened by the listener's left ear and the sound signal listened by the listener's right ear is set by the time difference setting circuit 38, and the level difference between them is set by the level difference setting circuit 39. (One example of Time Difference Setting Circuit; FIGS. 7-11)

Figure 7:
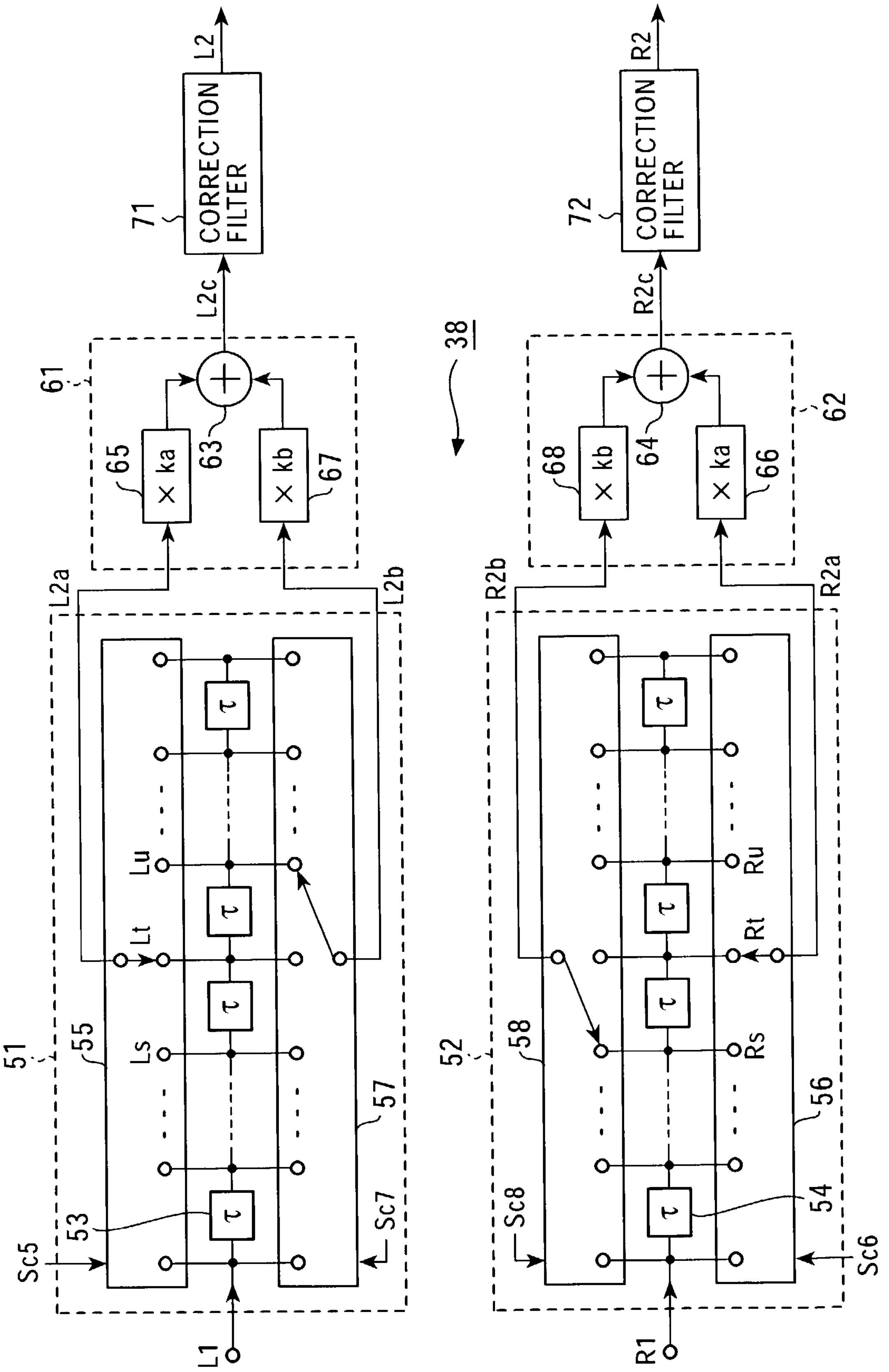
FIG. 7 is a circuit diagram showing one example of a time difference setting circuit in the system of FIG. 2.

FIG. 7 shows one example of the time difference setting circuit 38 in the sound production system of the first embodiment shown in FIG. 2. The time difference setting circuit 38 of this example comprises time delay setting circuits 51, 52, crossfade processing circuits 61, 62, and correction filters 71, 72.

In the time delay setting circuits 51 and 52, the sound signals L1 and R1 outputted from the digital filters 31 and 32 in FIG. 2 are successively delayed by multistage-connected delay circuits 53 and 54, successively. The delay circuits 53 and 54 serve as delay units each providing a delay time for each stage, which is equal to a sampling period τ of the sound signals L1 and R1.

For example, sampling frequency fs of the sound signals L1 and R1 is 44.1 kHz, and therefore the sampling period τ of the sound signals L1 and R1 is about 22.7 μsec. This value corresponds to a change in time delay of the left and right sound signals occurred when the rotational angle of the listener's head is about 3 degrees.

In the time delay setting circuit 51, in accordance with selection signals Sc5 and Sc7 as a part of a sound-image localization control signal Sc issued depending on the detected result of the rotational angle θ which is sent from the microprocessor 47 to the signal processing unit 30 as shown in FIG. 2, output signals from adjacent two stages of the delay circuits, which correspond to a rotational angle (direction) closest to the detected rotational angle θ and a rotational angle (direction) next closest to it, are taken out by respective selectors 55 and 57 as sound signals L2*a* and L2*b* outputted from the time delay setting circuit 51. In the time delay setting circuit 52, in accordance with selection signals Sc6 and Sc8 as a part of the sound-image localization control signal Sc, output signals from adjacent two stages of the delay circuits, which correspond to a rotational angle (direction) closest to the detected rotational angle θ and a rotational angle (direction) next closest to it, are taken out by respective selectors 56 and 58 as sound signals R2*a* and R2*b* outputted from the time delay setting circuit 52.

For example, when the rotational angle θ is in the range of 0 degree to +α (i.e., α in the rightward direction, α being about 3 degrees corresponding to τ), the selector 55 of the time delay setting circuit 51 takes out, as the sound signal L2*a*, an output signal Lt from the delay circuit at the middle stage, and the selector 57 takes out, as the sound signal L2*b*, a signal Ls advanced τ from the signal Lt. Also, the selector 56 of the time delay setting circuit 52 takes out, as the sound signal R2*a*, an output signal Rt from the delay circuit at the middle stage, and the selector 58 takes out, as the sound signal R2*b*, a signal Ru delayed τ from the signal Rt.

On the other hand, when the rotational angle θ is in the range of 0 degree to −α (i. e., α in the leftward direction), the selector 55 of the time delay setting circuit 51 takes out, as the sound signal L2*a*, an output signal Lt from the delay circuit at the middle stage, and the selector 57 takes out, as the sound signal L2*b*, a signal Lu delayed τ from the signal Lt. Also, the selector 56 of the time delay setting circuit 52 takes out, as the sound signal R2*a*, an output signal Rt from the delay circuit at the middle stage, and the selector 58 takes out, as the sound signal R2*b*, a signal Rs advanced τ from the signal Rt.

Then, the sound signals L2*a* and L2*b* outputted from the time delay setting circuit 51 are supplied to the crossfade processing circuit 61, and the sound signals R2*a* and R2*b* outputted from the time delay setting circuit 52 are supplied to the crossfade processing circuit 62.

In the crossfade processing circuit 61, the sound signal L2*a* is multiplied by a coefficient ka in a multiplier 65, the sound signal L2*b* is multiplied by a coefficient kb in a multiplier 67, and respective multiplied results of the multipliers 65 and 67 are added by an adder 63. Similarly, in the crossfade processing circuit 62, the sound signal R2*a* is multiplied by a coefficient ka in a multiplier 66, the sound signal R2*b* is multiplied by a coefficient kb in a multiplier 68, and respective multiplied results of the multipliers 66 and 68 are added by an adder 64.

Thus, sound signals L2*c* and R2*c* expressed by the following formulae are obtained as outputs of the crossfade processing circuits 61 and 62;

$$L2c=ka\times L2a+kb\times L2b \quad (1)$$

$$R2c=ka\times R2a+kb\times R2b \quad (2)$$

Figure 8:
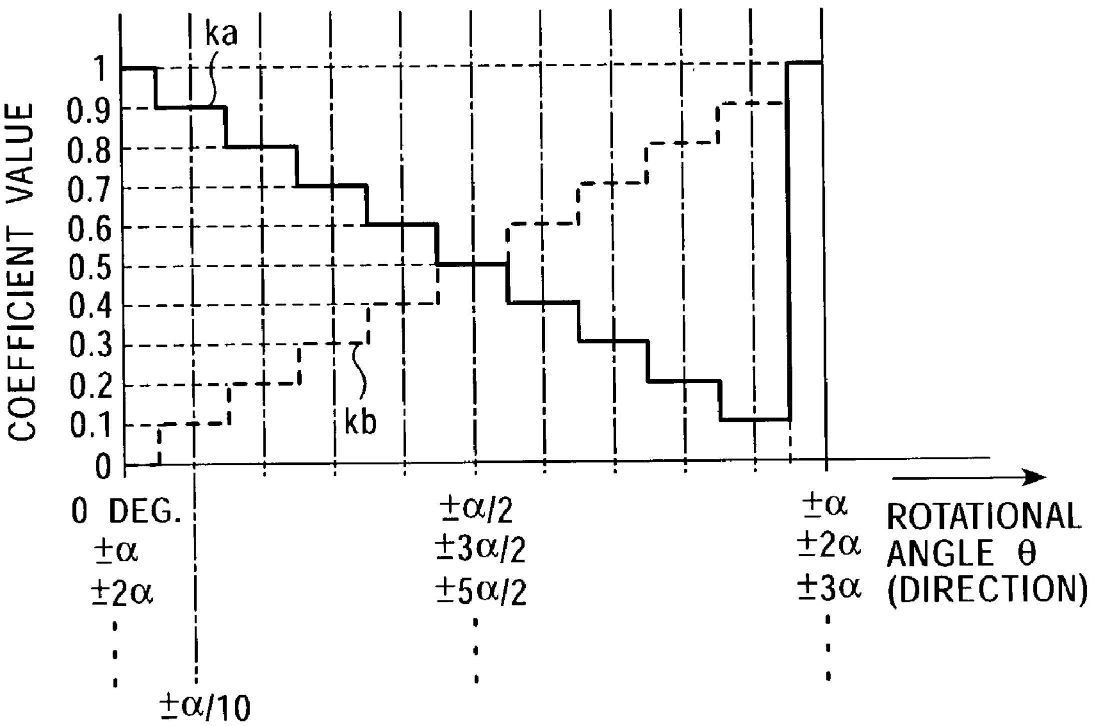
FIG. 8 is a graph for explaining the time difference setting circuit of FIG. 7.
Figure 9:
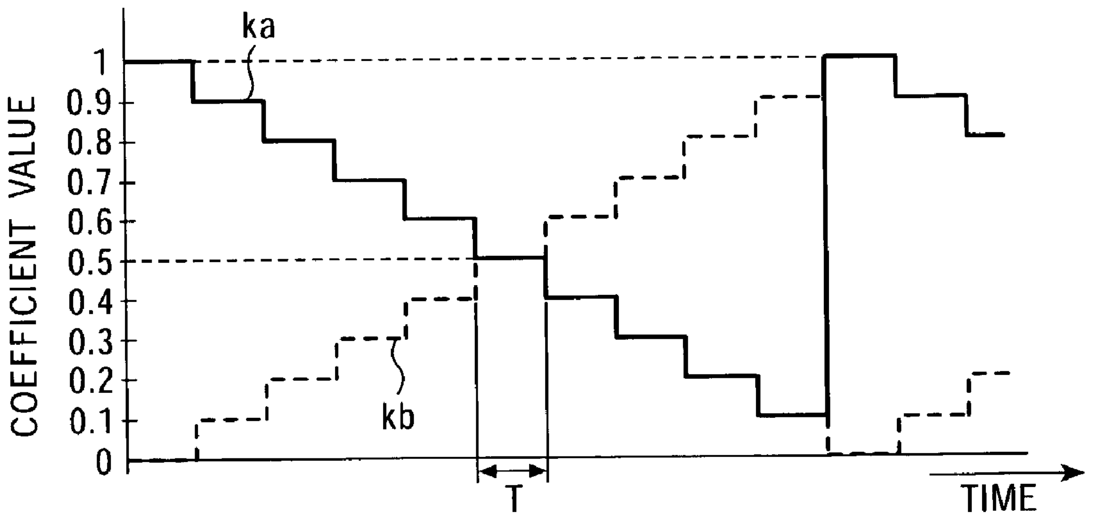
FIG. 9 is a graph for explaining the time difference setting circuit of FIG. 7.

For example, as shown in FIG. 8, the coefficients ka, kb are each set in 10 steps depending on the detected rotational angle θ. When the listener changes the facing direction, the coefficients ka, kb are changed in units of time τ, for example, as shown in FIG. 9.

More specifically, when the facing direction of the listener is at 0 degree, ka=1 and kb 0 are set. When the facing direction of the listener is at ±α/10, ka=0.9 and kb=0.1 are set. When the facing direction of the listener is at ±2α/10, ka=0.8 and kb=0.2 are set. When the facing direction of the listener is at ±3α/10, ka=0.7 and kb=0.3 are set. When the facing direction of the listener is at ±4α/10, ka=0.6 and kb=0.4 are set. When the facing direction of the listener is at ±5α/10, ka=0.5 and kb=0.5 are set. When the facing direction of the listener is at ±6α/10, ka=0.4 and kb=0.6 are set. When the facing direction of the listener is at ±7α/10, ka=0.3 and kb=0.7 are set. When the facing direction of the listener is at ±8α/10, ka=0.2 and kb=0.8 are set. When the facing direction of the listener is at ±9α/10, ka=0.1 and kb=0.9 are set. Further, when the facing direction of the listener is between ±α and ±2α, between ±2α and ±3α, and so on, the coefficients ka, kb are set in a similar manner.

Accordingly, when the facing direction of the listener is at 0 degree, the sound signals L2*c* and R2*c* are given by:

$$L2c=L2a=Lt \quad (3)$$

$$R2c=R2a=Rt \quad (4)$$

When the listener changes the facing direction from 0 degree to −α/2, the sound signals L2*c* and R2*c* are given by:

$$L2c=(L2a+L2b)/2=(Lt+Lu)/2 \quad (5)$$

$$R2c=(R2a+R2b)/2=(Rt+Rs)/2 \quad (6)$$

Further, when the listener changes the facing direction from −α/2 to −α, ka=1 and kb=0 are set. Then, the selectors 55, 57, 56 and 58 are changed over such that the selector 55 selects the signal Lu, the selector 57 selects a signal delayed τ from the signal Lu, the selector 56 selects the signal Rs, and the selector 58 selects a signal advanced τ from the signal Rs. Thus, the sound signals L2*c* and R2*c* are given by:

$$L2c=L2a=Lu \quad (7)$$

$$R2c=R2a=Rs \quad (8)$$

In this example, therefore, the resolution of a time delay in the Transfer Functions HL and HR from the sound source 5 to the left ear 1L and the right ear 1R of the listener 1 in FIG. 1 corresponds to the delay time for each stage of the delay circuits 53 and 54 in the time delay setting circuits 51 and 52, i.e., to 1/10 of the sampling period τ of the sound signals L1 and R1 outputted from the digital filters 31 and 32. Hence, when the sampling frequency fs of the sound signals L1 and R1 is 44.1 kHz and the sampling period τ is about 22.7 μsec, the resolution of the time delay corresponds to about 0.3 degree in terms of the rotational angle of the listener's head.

Note that while this example is constituted to obtain the angle resolution as 1/10 of the rotational angle of the listener's head corresponding to the delay time of the delay circuits 53 and 54, a practical value may be set depending on the angle resolution of a rotational angle detecting unit made of the angular velocity sensor 9, the microprocessor 47 for executing an integral process, and so on.

Accordingly, even when the facing direction of the listener is not a discrete predetermined direction represented by 0 degree or an integral multiple of ±3 degrees that is decided by the sampling period τ of the sound signals L1 and R1 outputted from the digital filters 31 and 32, but a direction between the discrete predetermined directions, such as ±1.5 or ±4.5 degrees, a sound image can be localized at the predetermined position, denoted by the sound source 5 in FIG. 1, precisely corresponding to the facing direction of the listener.

As a result of the interpolation described above, when the listener changes the facing direction, changes in waveforms of the sound signals L2*c* and R2*c* become moderate and changes in transfer characteristics become moderate, whereby shock noises are reduced.

Figure 10:
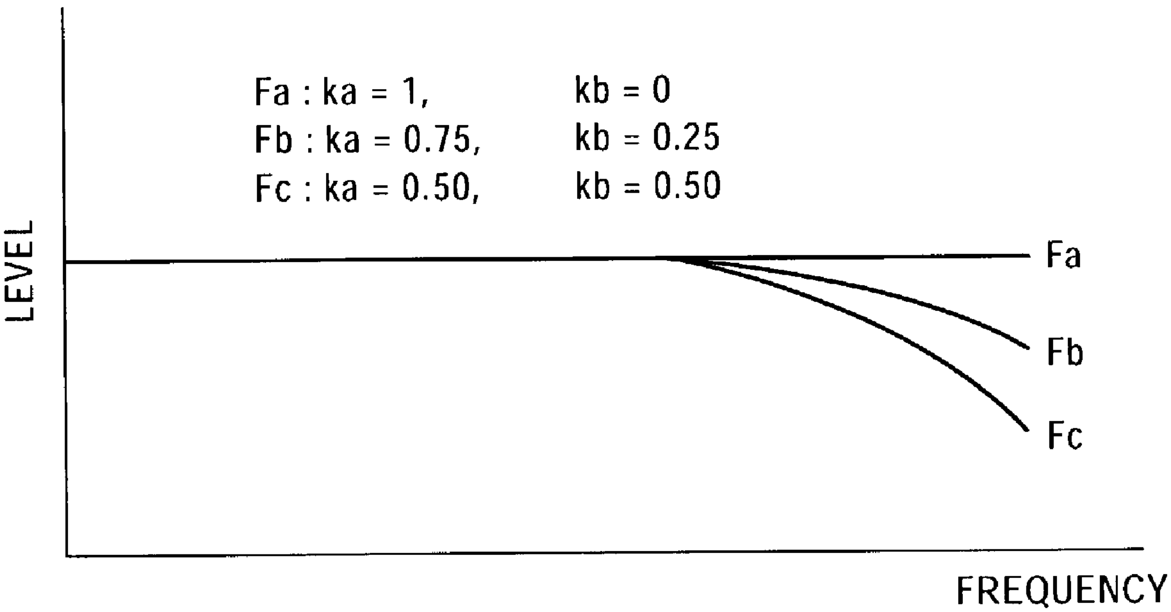
FIG. 10 is a graph for explaining the time difference setting circuit of FIG. 7.

In this example, however, since a pair of the time delay setting circuit 51 and the crossfade processing circuit 61 and a pair of the time delay setting circuit 52 and the crossfade processing circuit 62 each constitute one kind of FIR filter, frequency characteristics are changed depending on values of the coefficients ka, kb. More specifically, as shown in FIG. 10, when ka=1 and kb=0 are set, a flat frequency characteristic Fa is obtained. For example, when ka=0.75 and kb=0.25 are set, a frequency characteristic Fb providing a lower level in a high frequency range is obtained. When ka=0.5 and kb=0.5 are set, a frequency characteristic Fc providing an even lower level in a high frequency range is obtained.

Taking into account the above problem, in the example of FIG. 7, the sound signals L2*c* and R2*c* outputted from the crossfade processing circuits 61 and 62 are supplied to the correction filters 71, 72 for compensating frequency characteristic changes in the high-frequency range.

Figure 11:
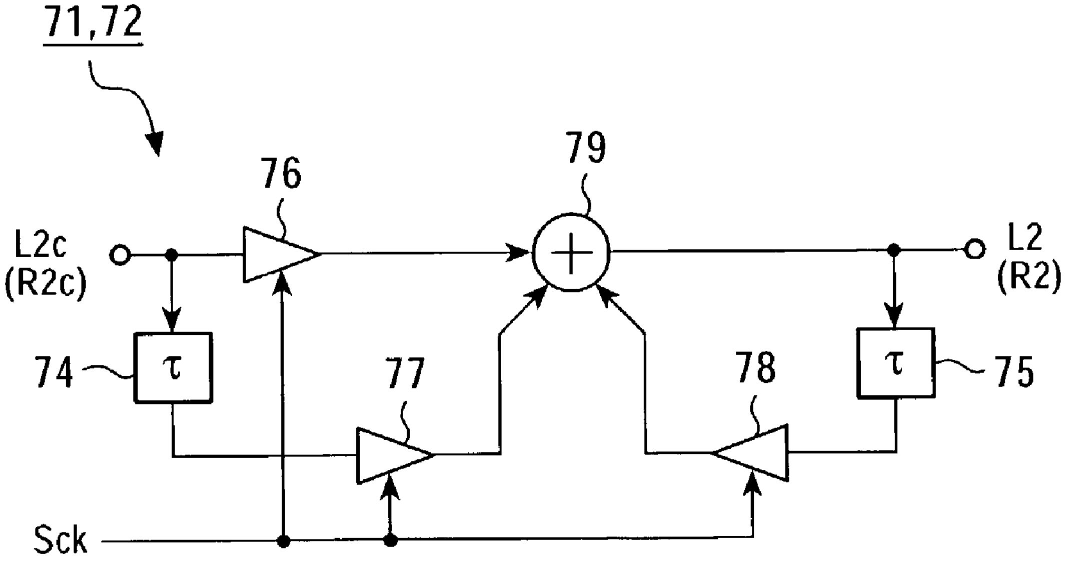
FIG. 11 is a circuit diagram showing one example of a correction filter in the time difference setting circuit of FIG. 7.

The correction filters 71, 72 are each constituted, for example, as shown in FIG. 11. The input sound signals L2$c$, R2$c$ are each delayed τ by a delay circuit 74, and later-described output sound signals L2, R2 are each delayed τ by a delay circuit 75. Multipliers 76, 77 and 78 multiply the input sound signal L2$c$ or R2$c$, an output signal of the delay circuit 74, and an output signal of the delay circuit 75 by respective coefficients. Multiplied results of the multipliers 76, 77 and 78 are added by an adder 79, and an added result is taken out as the output sound signal L2 or R2. The coefficients multiplied by the multipliers 76, 77 and 78 are set in accordance with a coefficient setting signal Sck as a part of the sound-image localization control signal Sc depending on the values of the above-mentioned coefficients ka, kb.

As a result, sound signals having frequency characteristics compensated in a high frequency range are obtained as the sound signals L2 and R2 outputted from the correction filters 71, 72.

The time difference setting circuit 38 in the example of FIG. 7 delivers the output sound signals L2 and R2 from the correction filters 71, 72 as sound signals outputted from the time difference setting circuit 38, and supplies the output sound signals L2 and R2 to the level difference setting circuit 39 of the signal processing unit 30 as shown in FIG. 2.

Figure 6:
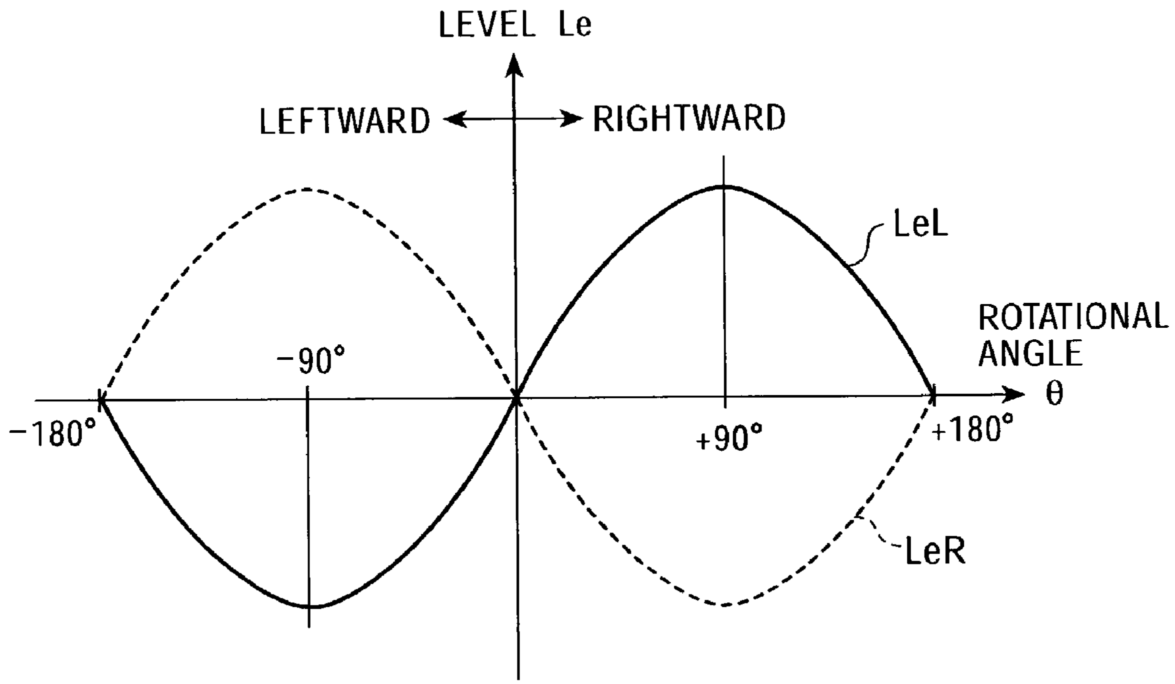
FIG. 6 is a graph showing the relationship between the facing direction of a listener and levels of signals reaching both ears of the listener.

In response to the sound-image localization control signal Sc, the level difference setting circuit 39 sets levels of the sound signals L2 and R2 outputted from the time difference setting circuit 38 depending on the detected rotational angle θ in accordance with the characteristics shown in FIG. 6, thereby setting the level difference between the sound signals L2 and R2.

Then, digital sound signals L3 and R3 outputted from the level difference setting circuit 39 are converted to analog sound signals by D/A converters 41L and 41R. The resulting 2-channel analog sound signals are amplified by sound amplifiers 42L and 42R, and supplied to the left and right acoustic transducers 3L, 3R of the headphones 3, respectively.

As a matter of course, the positions of the time difference setting circuit 38 and the level difference setting circuit 39 in the arrangement of the signal processing unit 30 may be replaced with each other. Also, while the correction filters 71 and 72 are described above as a part of the time difference setting circuit 38, those filters may be inserted at any desired places within signal routes of the signal processing unit 30, such as the input side of the digital filters 31 and 32, the input side of the time difference setting circuit 38, or the output side of the level difference setting circuit 39.

Figure 12:
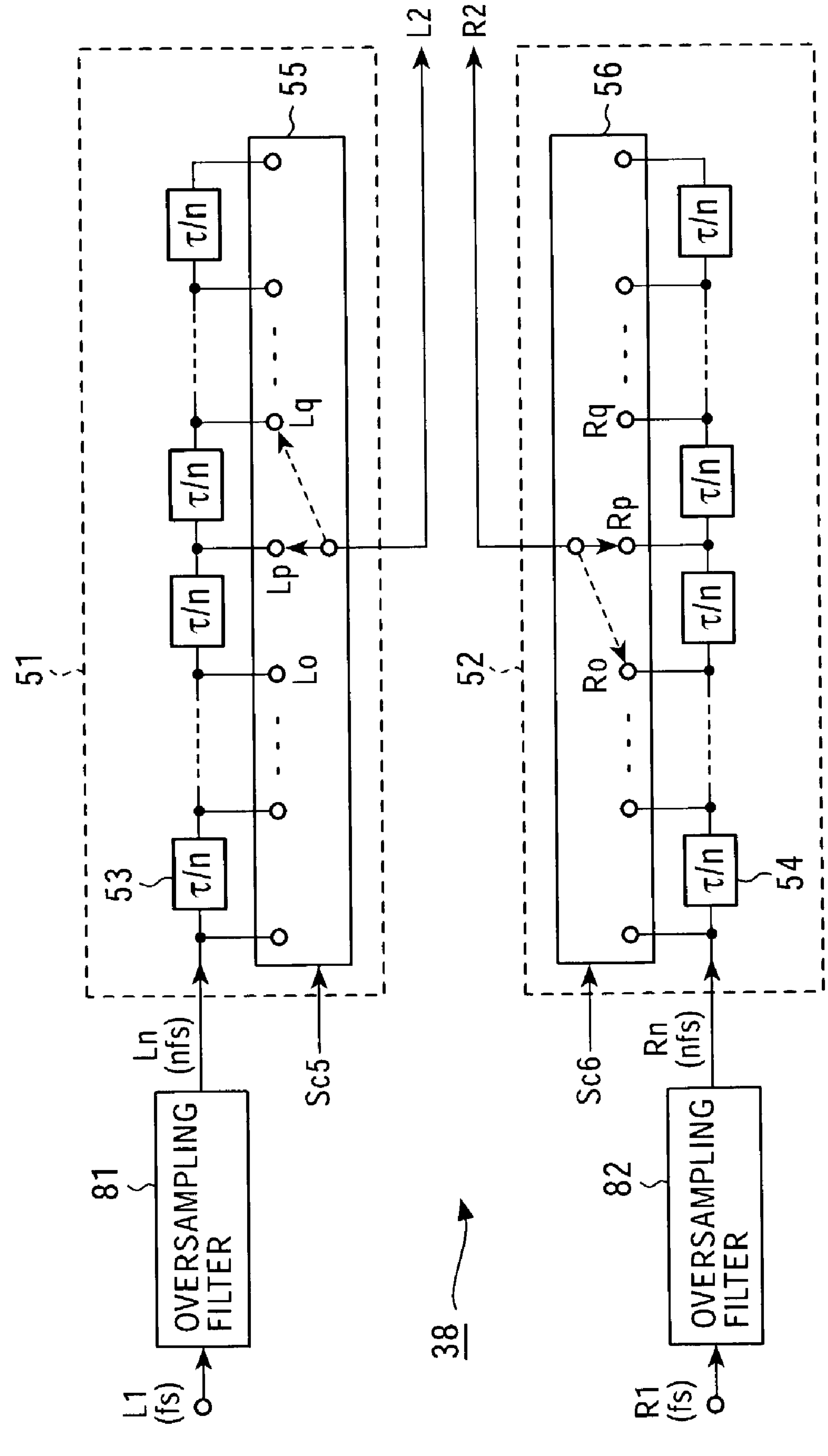
FIG. 12 is a circuit diagram showing another example of the time difference setting circuit in the system of FIG. 2.

(Another example of Time Difference Setting Circuit; FIG. 12)

FIG. 12 shows another example of the time difference setting circuit 38 in the sound production system of the first embodiment shown in FIG. 2. The time difference setting circuit 38 of this example comprises oversampling filters 81, 82 and time delay setting circuits 51, 52.

The oversampling filters 81, 82 convert respectively the output signals of the digital filters 31 and 32 in FIG. 2 from the sound signals L1 and R1 having the sampling frequency fs to sound signals Ln and Rn having sampling frequency nfs (n multiple of fs). By setting n=4, for example, the sampling frequency of the sound signals outputted from the digital filters 31 and 32 is converted from the above-mentioned value 44.1 kHz to 176.4 kHz.

In the time delay setting circuits 51 and 52, the sound signals Ln and Rn outputted from the oversampling filters 81, 82 are successively delayed by multistage-connected delay circuits 53 and 54, respectively. The delay circuits 53 and 54 serve as delay units each providing a delay time for each stage, which is equal to the sampling period τ/n of the sound signals Ln and Rn.

Assuming the sampling frequency fs of the sound signals L1 and R1 to be 44.1 kHz and n=4, the sampling period τ/n of the sound signals Ln and Rn is about 5.7 μsec that corresponds to a change in time delay of the left and right sound signals occurred when the rotational angle of the listener's head is about 0.75 degree.

In the time delay setting circuits 51 and 52, in accordance with selection signals Sc5 and Sc6 as a part of the sound-image localization control signal Sc, output signals of respective stages of the delay circuits, which correspond to a rotational angle (direction) closest to the detected rotational angle θ, are taken out by respective selectors 55 and 56 as the sound signals L2 and R2 outputted from the time difference setting circuit 38.

For example, when the rotational angle θ is 0 degree, the selectors 55 and 56 take out respective output signals Lp and Rp from the delay circuits at the middle stages. When the rotational angle θ is +α/n (i.e., α/n in the rightward direction, α/n being about 0.75 degree corresponding to τ/n), the selector 55 takes out a signal Lo advanced τ/n from the signal Lp, and the selector 56 takes out a signal Rq delayed τ/n from the signal Rp. When the rotational angle θ is −α/n (i.e., α/n in the leftward direction), the selector 55 takes out a signal Lq delayed τ/n from the signal Lp, and the selector 56 takes out a signal Ro advanced τ/n from the signal Rp.

In this example, therefore, the resolution of a time delay in the Transfer Functions HL and HR from the sound source 5 to the left ear 1L and the right ear 1R of the listener 1 in FIG. 1 corresponds to the delay time τ/n for each stage of the delay circuits 53 and 54 in the time delay setting circuits 51 and 52, i.e., to 1/n of the sampling period τ of the sound signals L1 and R1 outputted from the digital filters 31 and 32. Hence, when the sampling frequency fs of the sound signals L1 and R1 is 44.1 kHz and the sampling period τ is about 22.7 μsec with setting of n=4, the resolution of the time delay corresponds to about 0.75 degree in terms of the rotational angle of the listener's head.

Accordingly, even when the facing direction of the listener is not a discrete predetermined direction represented by 0 degree or an integral multiple of ±3 degrees that is decided by the sampling period τ of the sound signals L1 and R1 outputted from the digital filters 31 and 32, but a direction between the discrete predetermined directions, such as ±1.5 or ±4.5 degrees, a sound image can be localized at the predetermined position, denoted by the sound source 5 in FIG. 1, precisely corresponding to the facing direction of the listener.

When the listener changes the facing direction, the sound signals L2 and R2 are changed over in units of a small angle of 0.75 degree. As a result, changes in waveforms of the sound signals L2 and R2 become moderate and changes in transfer characteristics become moderate, whereby shock noises are reduced.

Figure 13:
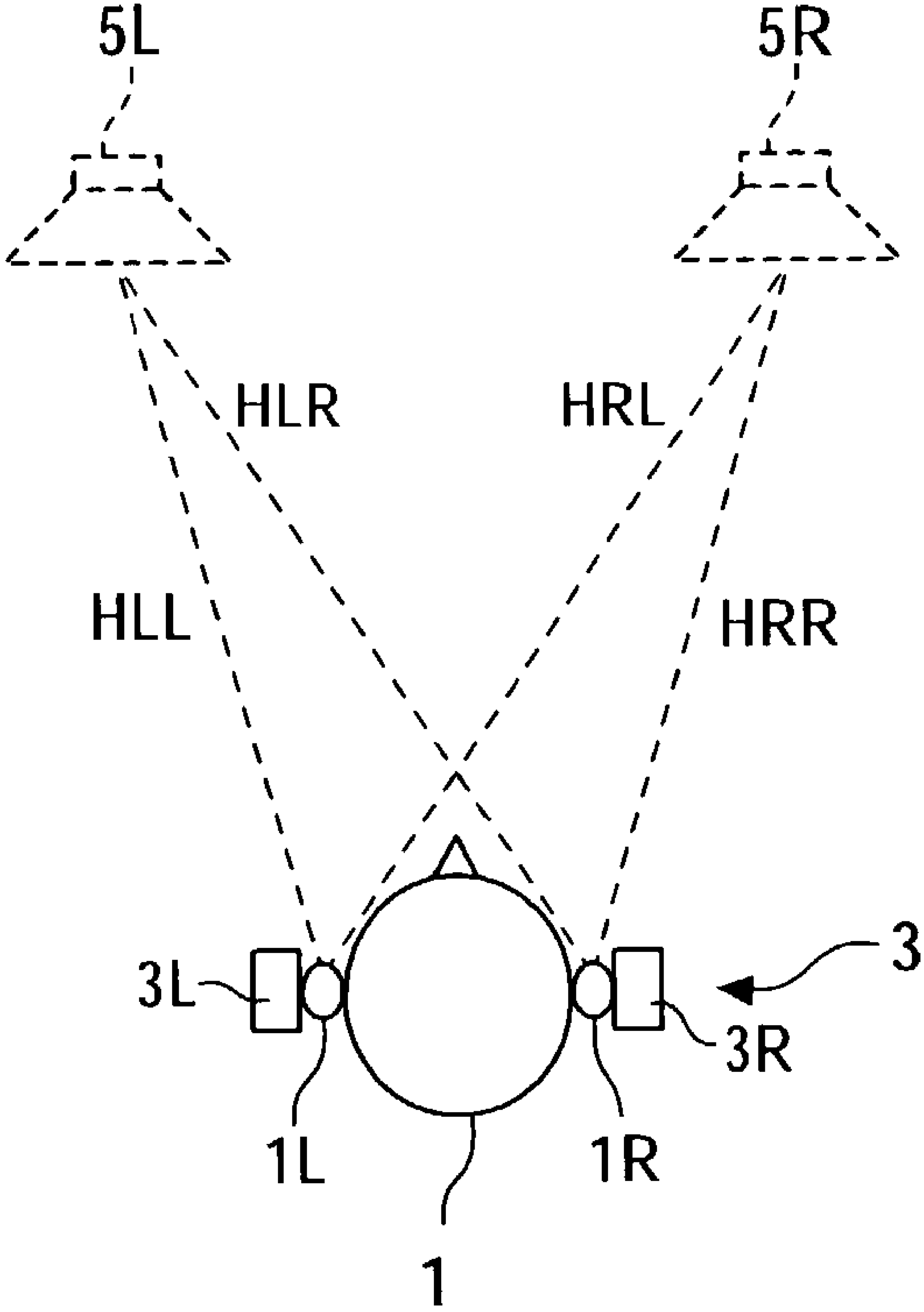
FIG. 13 is an illustration for explaining the principle in localizing a sound image at an arbitrary fixed position outside the head of a listener.
Figure 14:
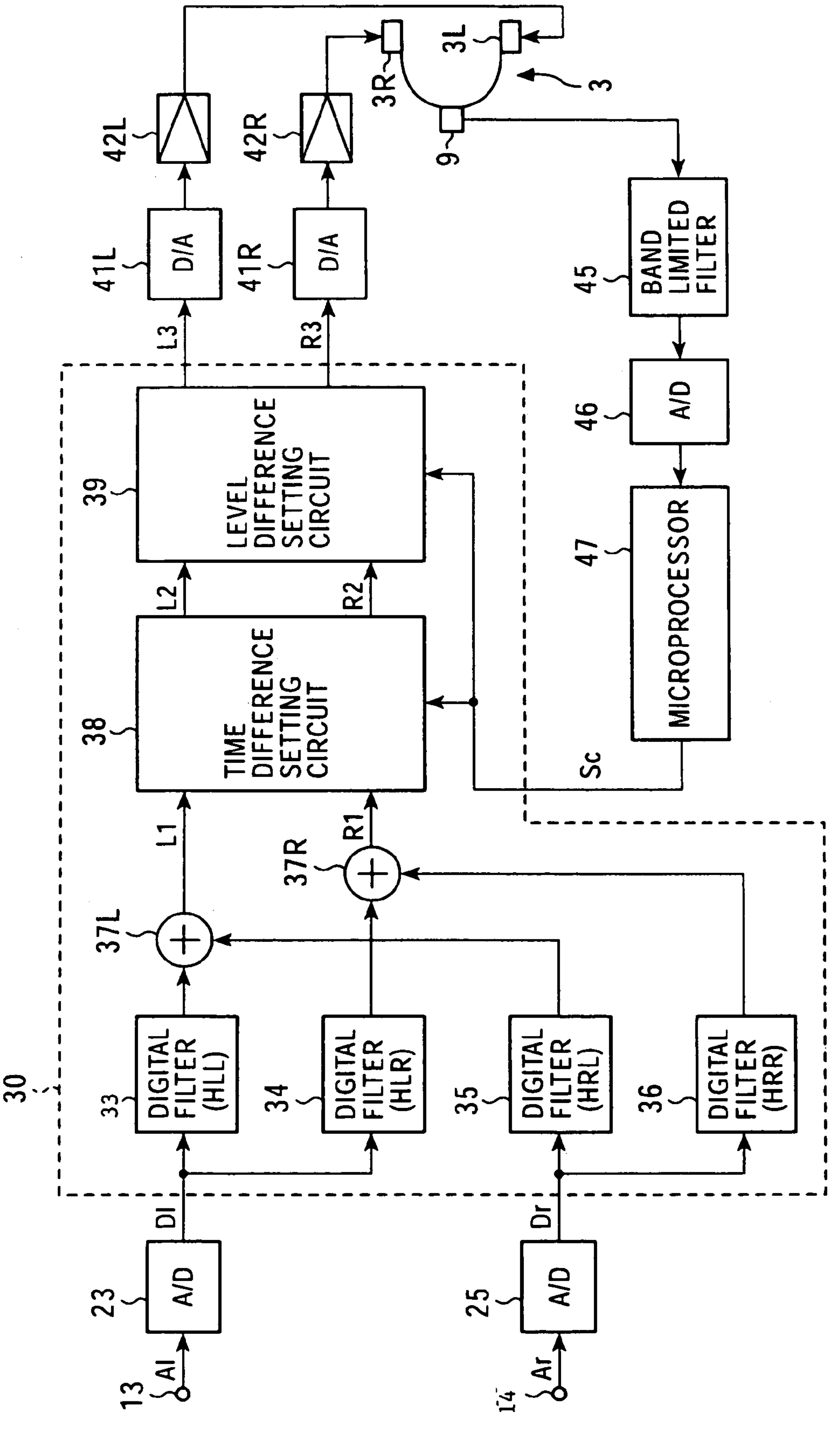
FIG. 14 is a block diagram showing a second embodiment of the sound reproduction system of the present invention.

(Second Embodiment; FIGS. 13 and 14)

The present invention is also applicable to the case of listening to stereo sound signals with headphones.

FIG. 13 shows the principle for sound reproduction in that case. A listener 1 wears headphones 3 and listens to sounds with left and right acoustic transducers 3L, 3R of the headphones 3. Then, sound images of left and right sound signals are localized at arbitrary fixed left and right positions, which are denoted respectively by sound sources 5L and 5R, outside the listener's head regardless of whether the listener 1 faces rightward or leftward.

It is herein assumed that HLL and HLR represent respective Head Related Transfer Functions (HRTF) from the sound source 5L to a left ear 1L and a right ear 1R of the listener 1 when the listener 1 faces in a predetermined direction, e.g., in a direction toward the middle between the sound sources 5L and 5R where the left and right sound images are to be localized as shown in FIG. 13, and that HRL and HRR represent respective Head Related Transfer Functions from the sound source 5R to the left ear 1L and the right ear 1R of the listener 1 on the same condition.

FIG. 14 shows one embodiment of the sound reproduction systems of the present invention for implementing the above-described principle. Left and right input analog sound signals Al and Ar corresponding to signals from the sound sources 5L and 5R in FIG. 13 are supplied to input terminals 13 and 14, and then converted to digital sound signals Dl and Dr by A/D converters 23 and 25, respectively. The resulting digital sound signals Dl and Dr are supplied to a signal processing unit 30.

The signal processing unit 30 is constituted so as to have the functions of digital filters 33, 34, 35 and 36 for convoluting, on the input sound signals, impulse responses corresponding to the above-mentioned Transfer Functions HLL, HLR, HRL and HRR.

Then, the digital sound signal Dl from the A/D converter 23 is supplied to the digital filters 33 and 34, and the digital sound signal Dr from the A/D converter 25 is supplied to the digital filters 35 and 36. Sound signals outputted from the digital filters 33 and 35 are added by an adder 37L, and sound signals outputted from the digital filters 34 and 36 are added by an adder 37R. Sound signals L1 and R1 outputted from the adders 37L and 37R are supplied to a time difference setting circuit 38.

The circuit construction subsequent to the time difference setting circuit 38 is the same as that in the first embodiment of FIG. 2. The time difference setting circuit 38 is constructed, by way of example, as shown in FIG. 7 or 12.

With this second embodiment, therefore, similar advantages are also obtained in that sound images can be always localized at predetermined positions precisely corresponding to the facing direction of a listener, and shock noises generated upon changes in the facing direction of the listener are reduced, thus resulting in sound signals with good sound quality.

Figure 15:
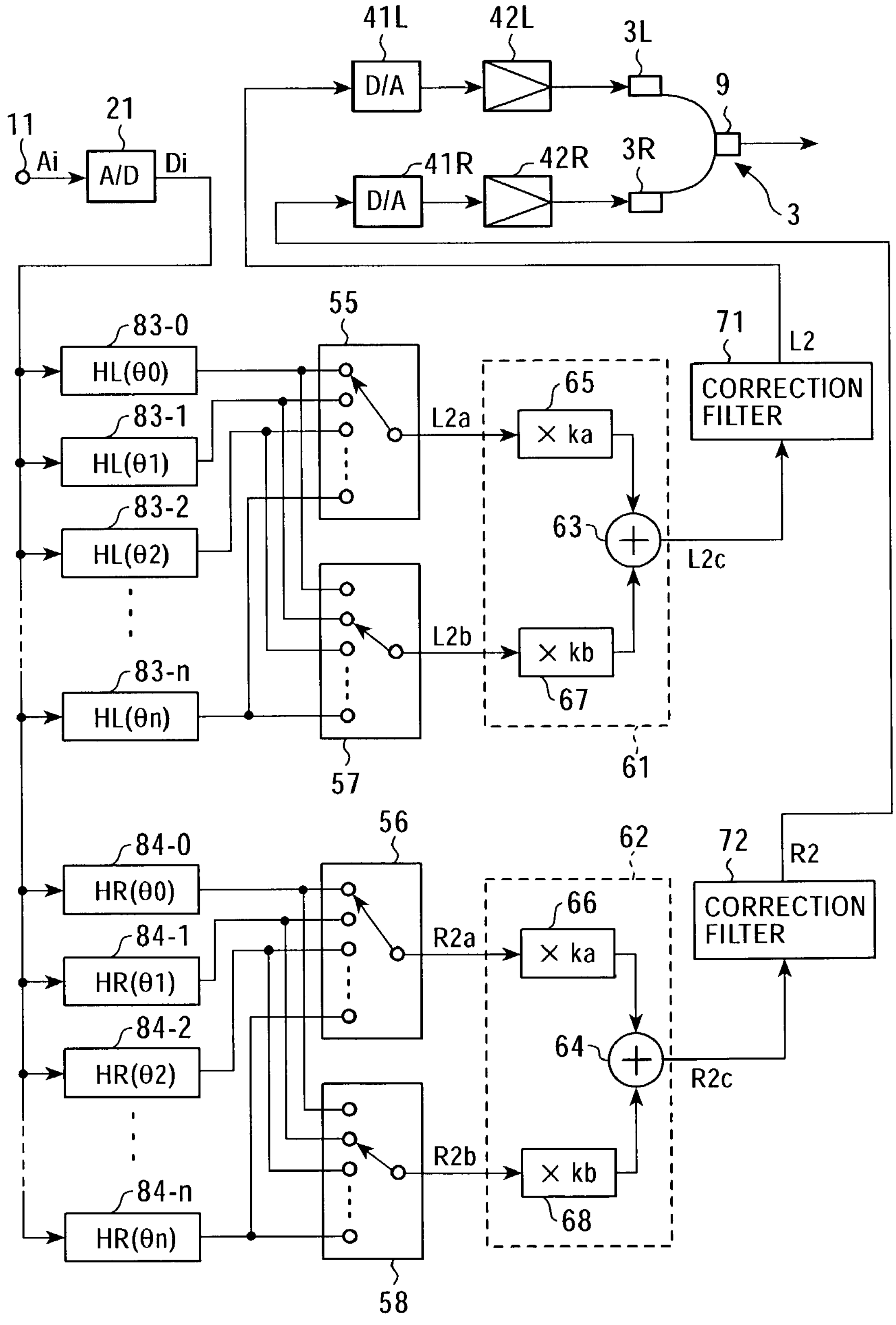
FIG. 15 is a block diagram showing a third embodiment of the sound reproduction system of the present invention.

(Third Embodiment; FIG. 15)

FIG. 15 shows still another embodiment of the sound reproduction system of the present invention. This embodiment represents the case of listening to a 1-channel sound signal with headphones similarly to FIG. 1.

In this third embodiment, digital filters 83-0, 83-1, 83-2, . . . , 83-n and digital filters 84-0, 84-1, 84-2, . . . , 84-n are provided to convolute, on an input digital sound signal Di, impulse responses corresponding to Head Related Transfer Functions HL(θ0), HL(θ1), HL(θ2), . . . , HL(θn) from the sound source 5 to the left ear 1L of the listener 1 in FIG. 1 and Head Related Transfer Functions HR(θ0), HR(θ1), HR(θ2), . . . , HR(θn) from the sound source 5 to the right ear 1R of the listener 1, when the rotational angle θ is θ0, θ1, θ2, . . . , θn, respectively. The input digital sound signal Di from an A/D converter 21 is supplied to the digital filters 83-0, 83-1, 83-2, . . . , 83-n and the digital filters 84-0, 84-1, 84-2, . . . , 84-n. The rotational angles θ0, θ1, θ2, . . . , θn are set, for example, at equiangular intervals in the circumferential direction about the listener.

As with the embodiments of FIGS. 2 and 14, though not shown in FIG. 15, the rotational angle (direction) θ of the listener's head wearing headphones 3 is detected from an output signal of an angular velocity sensor 9 attached to the headphones 3.

Then, selectors 55 and 57 select, as sound signals L2*a* and L2*b*, output signals from adjacent two of the digital filters 83-0, 83-1, 83-2, . . . , 83-n, which correspond to a rotational angle (direction) closest to the detected rotational angle θ and a rotational angle (direction) next closest to it, respectively. Also, selectors 56 and 58 select, as sound signals R2*a* and R2*b*, output signals from adjacent two of the digital filters 84-0, 84-1, 84-2, . . . , 84-n, which correspond to a rotational angle (direction) closest to the detected rotational angle θ and a rotational angle (direction) next closest to it, respectively.

For example, when the rotational angle θ is in the range of θ0 to θ1, the selector 55 takes out an output signal of the digital filter 83-0 as the sound signal L2*a*, the selector 57 takes out an output signal of the digital filter 83-1 as the sound signal L2*b*, the selector 56 takes out an output signal of the digital filter 84-0 as the sound signal R2*a*, and the selector 58 takes out an output signal of the digital filter 84-1 as the sound signal R2*b*.

Subsequently, the sound signals L2*a* and L2*b* outputted from the selectors 55 and 57 are supplied to a crossfade processing circuit 61, and the sound signals R2*a* and R2*b* outputted from the selectors 56 and 58 are supplied to a crossfade processing circuit 62.

In each of the crossfade processing circuits 61 and 62, interpolations expressed by the above-described formulae (1) and (2) are executed similarly to those in the time difference setting circuit 38 in the example of FIG. 7 used in the sound reproduction system of FIG. 2 according to the first embodiment.

Also with this third embodiment, therefore, even when the facing direction of the listener is not a discrete predetermined direction, but a direction between the discrete predetermined directions, such as between θ0 and θ1 or between θ1 and θ2, a sound image can be localized at the predetermined position denoted by the sound source 5 in FIG. 1 precisely corresponding to the facing direction of the listener. Moreover, when the listener changes the facing direction, changes in waveforms of the output sound signals, L2*c* and R2*c* become moderate and changes in transfer characteristics become moderate, whereby shock noises are reduced.

Further, as with the time difference setting circuit 38 in the example of FIG. 7, the sound signals L2*c* and R2*c* outputted from the crossfade processing circuits 61 and 62 are supplied in this third embodiment to correction filters 71 and 72 for compensating frequency characteristic changes in a high frequency range, so that level lowering in the high frequency range caused in the crossfade processing circuits 61 and 62 is compensated.

In this third embodiment, since the sound signals are processed including both the time difference and the level difference between the sound signal listened by the left ear of the listener and the sound signal listened by the right ear through filtering in the digital filters 83-0, 83-1, 83-2, . . . , 83-n and the digital filters 84-0, 84-1, 84-2, . . . , 84-n, the sound signals L2 and R2 outputted from the correction filters 71 and 72 are directly converted to analog sound signals by D/A converters 41L and 41R. The resulting 2-channel analog sound signals are amplified by sound amplifiers 42L and 42R, and then supplied to the left and right acoustic transducers 3L, 3R of the headphones 3, respectively.

Figure 16:
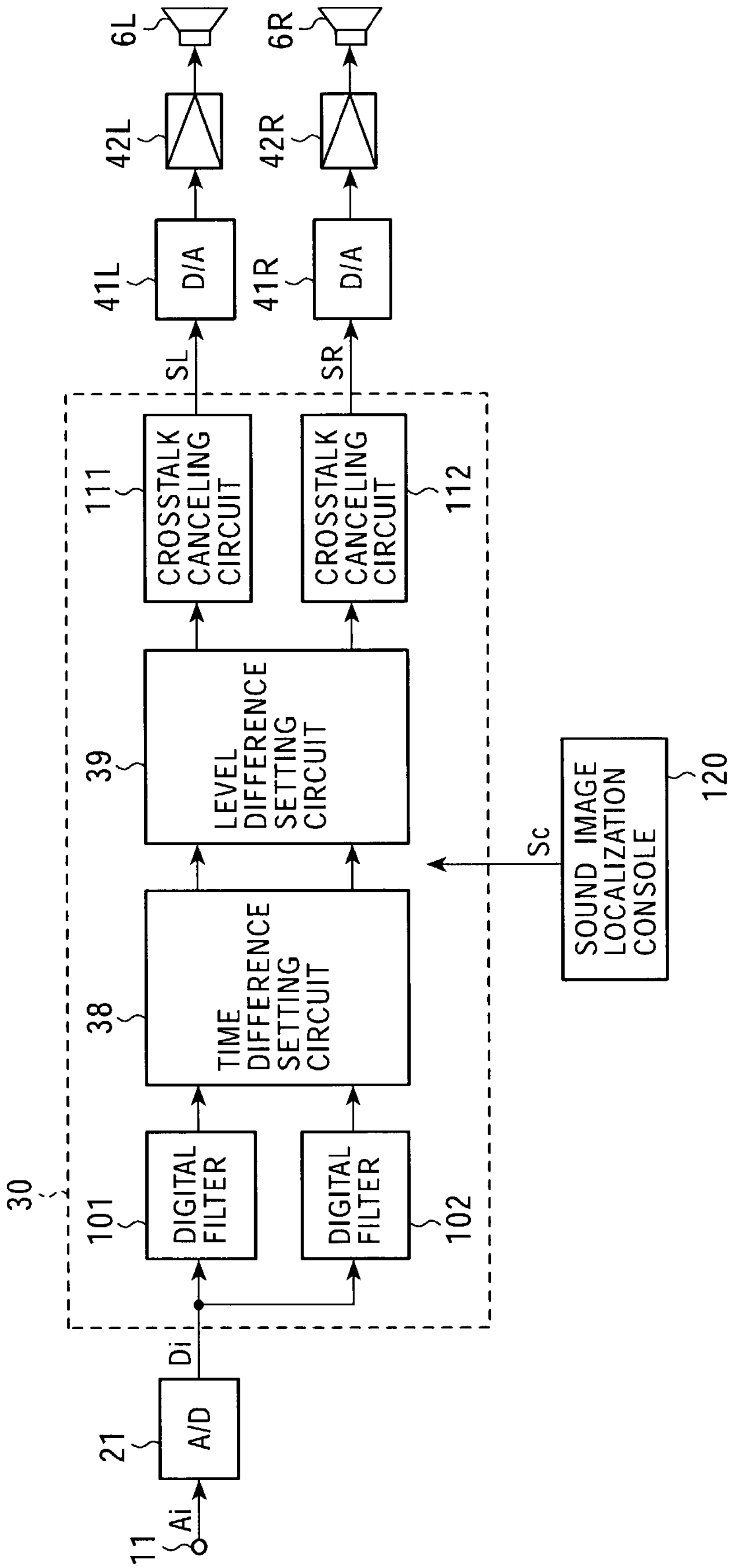
FIG. 16 is a block diagram showing a fourth embodiment of the sound reproduction system of the present invention.
Figure 17:
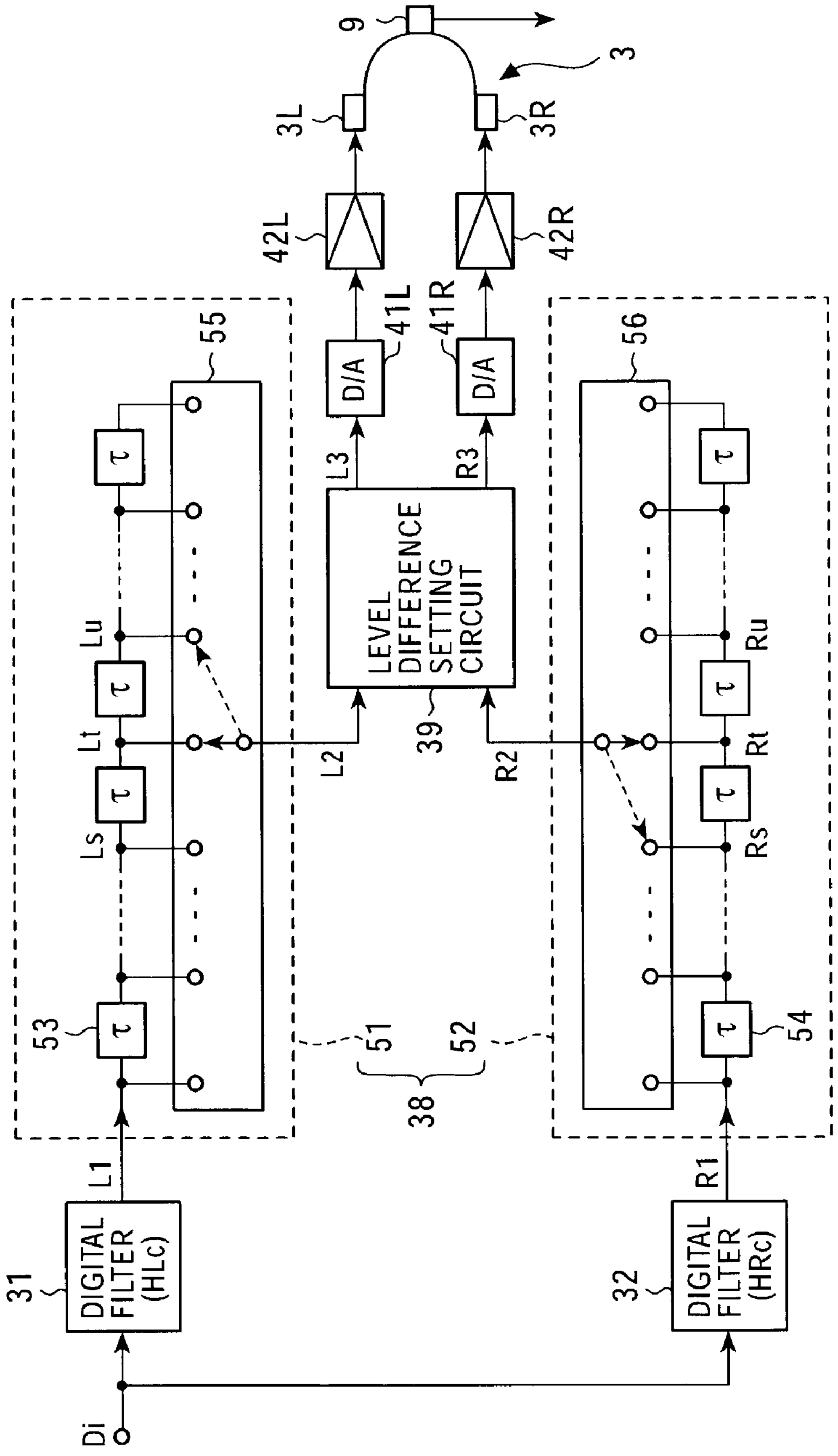
FIG. 17 is a block diagram showing one example of conventional sound reproduction systems.
Figure 18:
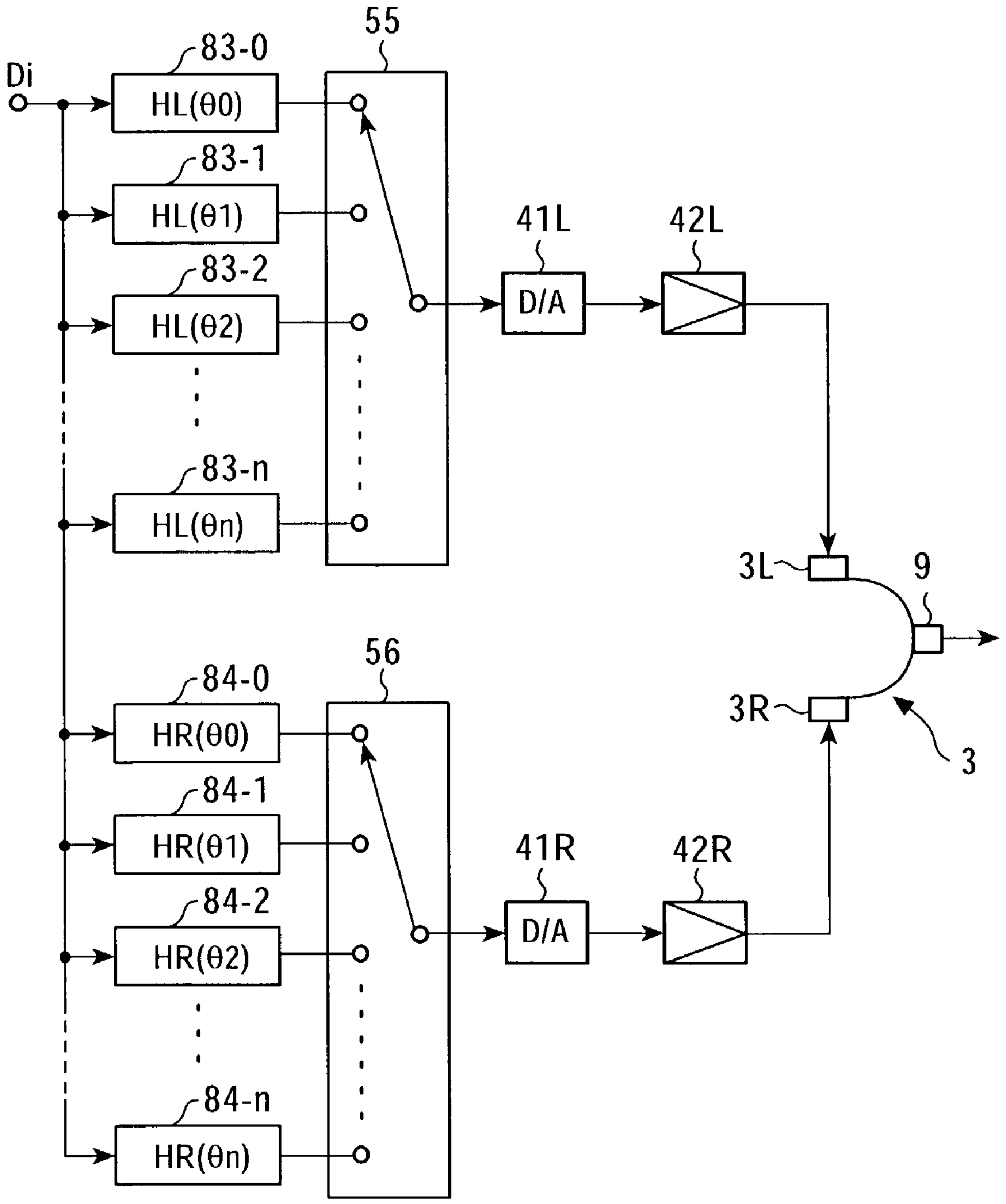
FIG. 18 is a block diagram showing another example of conventional sound reproduction systems.

(Fourth Embodiment; FIG. 16)

While the above embodiments have been described in connection with the case of listening to sounds with headphones and localizing a sound image at an arbitrary fixed position outside the head of a listener, the present invention is also applicable to the case of listening to sounds with speakers or headphones and localizing a sound image at an arbitrary changeable position around the listener.

FIG. 16 shows one embodiment of the sound reproduction system of the present invention adapted for the above latter case. Speakers 6L and 6R are arranged, e.g., at left and right positions symmetrical with respect to a direction just in front of a listener or at left and right position on both sides of an image display for a video game machine or the like.

An input analog sound signal Ai supplied to a terminal 11 is converted to a digital sound signal Di by an A/D converter 21. The resulting digital sound signal Di is supplied to a signal processing unit 30.

The signal processing unit 30 is constituted so as to have the functions of digital filters 101, 102, a time difference setting circuit 38, a level difference setting circuit 39, and crosstalk canceling circuits 111, 112. The digital sound signal Di from the A/D converter 21 is supplied to the digital filters 101 and 102.

The digital filters 101, 102, the time difference setting circuit 38, and the level difference setting circuit 39 cooperate to realize Head Related Transfer Functions from the position of a localized sound image, which is changed by a listener, to a left ear and a right ear of the listener.

More specifically, in this fourth embodiment, when the listener makes an operation for changing the localized sound image on a sound image localization console 120 such as a joystick, a sound-image localization control signal Sc is sent from the sound image localization console 120 to the signal processing unit 30.

The time difference and the level difference between the sound signal supplied to the speaker 6L and the sound signal supplied to the speaker 6R are set in accordance with the sound-image localization control signal Sc, whereby Head Related Transfer Functions from the position of the localized sound image, which has been changed by the listener, to the left ear and the right ear of the listener is provided.

In practice, the time difference setting circuit 38 is constituted like the example of FIG. 7 or 12 similarly to the first embodiment shown in FIG. 2. Taking the example of FIG. 7 as one instance, in accordance with the sound-image localization control signal Sc, the selectors 55, 57 of the time delay setting circuit 51 and the selectors 56, 58 of the time delay setting circuit 52 take out, as the sound signals L2*a*, L2*b* outputted from the time delay setting circuit 51 and the sound signals R2*a*, R2*b* outputted from the time delay setting circuit 52, respective output signals from adjacent two stages of the delay circuits in each time delay setting circuit, which correspond to a sound image position closest to the localized sound position having been changed and a sound image position next closest to it. Further, the coefficients ka, kb of the cross-fade processing circuits 61 and 62 are set depending on the localized sound position having been changed. Taking the example of FIG. 12 as another instance, the selector 55 of the time delay setting circuit 51 and the selector 56 of the time delay setting circuit 52 take out, as the sound signal L2 outputted from the time delay setting circuit 51 and the sound signal R2 outputted from the time delay setting circuit 52, output signals from stages of the delay circuits in respective time delay setting circuits, which correspond to a sound image position closest to the localized sound position having been changed.

Accordingly, even when the localized sound position having been changed by the listener is not a discrete predetermined position, but a position between the discrete predetermined directions, a sound image can be precisely localized at the predetermined position. Further, when the listener changes the localized sound position, changes in waveforms of the output sound signals become moderate and changes in transfer characteristics become moderate, whereby shock noises are reduced.

The crosstalk canceling circuits 111 and 112 serve to cancel crosstalks from the speaker 6L to the right ear of the listener and from the speaker 6R to the left ear of the listener.

The two-channel digital sound signals SL and SR outputted from the signal processing unit 30 are converted to analog sound signals by D/A converters 41L and 41R. The resulting 2-channel analog sound signals are amplified by sound amplifiers 42L and 42R, and supplied to the speakers 6L and 6R, respectively.

While, in the fourth embodiment of FIG. 16, the time difference setting circuit 38 is provided and constituted like the example of FIG. 7 or 12 as with the first embodiment shown in FIG. 2, it is also possible to localize a sound image at an arbitrary changeable position around the listener by employing the same signal processing configuration as that in the third embodiment of FIG. 15.

According to the present invention, as described above, when localizing a sound image at an arbitrary fixed position outside the head of a listener, the sound image can be always localized at a predetermined position precisely corresponding to the facing direction of the listener, and shock noises generated upon changes in the facing direction of the listener are reduced, thus resulting in sound signals with good sound quality.

Also, when localizing a sound image at an arbitrary changeable position around the listener, the sound image can be precisely localized at the arbitrary position, and shock noises generated upon changes in the facing direction of the listener are reduced, thus resulting in sound signals with good sound quality.

What is claimed is:

1. A sound signal processing method comprising:

executing signal processing on an input sound signal and producing a first processed sound signal and a second processed sound signal to localize a sound image of the input sound signal in a reference position;

delaying the first processed sound signal by a number of delay times each being an integral multiple of a sampling period of the input sound signal to produce a first set of delayed sound signals, and delaying the second processed sound signal by said number of delay times to produce a second set of delayed sound signals;

selecting a first delayed signal and a second delayed signal from the first set of delayed sound signals depending on the reference position and a target position in which the sound image is to be localized so as to form a first pair of delayed sound signals, and selecting a first delayed signal and a second delayed signal from the second set of delayed sound signals depending on said reference position and said target position so as to form a second pair of delayed sound signals; and adding the first delayed signal and the second delayed signal from the first pair of delayed sound signals in a first proportion depending on the reference position and the target position so as to produce a first output sound signal having a delay, and adding up the first delayed signal and the second delayed signal from the second pair of delayed sound signals in a second proportion depending on the reference position and the target position so as to produce a second output sound signal having a delay.

2. The sound signal processing method according to claim 1, further comprising compensating frequency characteristic changes in the first output sound signal and the second output sound signal caused by said adding steps.

3. The sound signal processing method according to claim 1, wherein said first proportion and said second proportion vary in said steps of adding when said target position is changed.

4. The sound signal processing method according to claim 1, further comprising introducing a sound level difference between the first processed sound signal and the second processed sound signal, wherein said sound level difference is introduced by increasing the sound level of one said processed sound signal while reducing the sound level of the other said processed sound signal.

5. The sound signal processing method according to claim 1, wherein said step of executing signal processing comprises filtering the input sound signal to localize the sound image of the input sound signal in said reference position, said filtering step further comprising convoluting, on the input sound signal, impulse responses corresponding to head related transfer functions from said sound image localized in said reference position to left and right ears of a listener.

6. The sound signal processing method according to claim 1, wherein said target position is decided by detecting a rotational angle of a listener's head.

7. The sound signal processing method according to claim 1, said selecting step further comprising selecting said first delayed signal from the first set of delayed sound signals that is delayed by a first delay time and selecting said second delayed signal from the first set of delayed sound signals that is delayed by a second delay time that is different from said first delay time of said first delayed signal of said first set of delayed sound signals so as to form said first pair of delayed sound signals; and selecting said first delayed signal from the second set of delayed sound signals that is delayed by a first delay time and selecting said second delayed signal from the second set of delayed sound signals that is delayed by a second delay time that is different from said first delay time of said first delayed signal of said second set of delayed sound signals so as to form said second pair of delayed sound signals.

8. The sound signal processing method according to claim 1, wherein the delay of the first output sound signal and the delay of the second output signal vary in an inversely complementary manner depending on the reference position and the target position, such that when the delay of the first output signal increases, the delay of the second output signal decreases.

9. A sound reproduction apparatus comprising:

signal processing means for executing signal processing on an input sound signal and producing a first processed sound signal and a second processed sound signal to localize a sound image of the input sound signal in a reference position;

delay means for delaying the first processed sound signal by a number of delay times each being an integral multiple of a sampling period of the input sound signal to produce a first set of delayed sound signals, and delaying the second processed sound signal by said number of delay times each being an integral multiple of the sampling period of the input sound signal to produce a second set of delayed sound signals;

selecting means for selecting a first delayed signal and a second delayed signal from the first set of delayed sound signals depending on the reference position and a target position in which the sound image is to be localized to form a first pair of delayed sound signals, and selecting a first delayed signal and a second delayed signal from the second set of delayed sound signals depending on said reference position and said target position to form a second pair of delayed sound signals; and adding means for adding up the first delayed signal and the second delayed signal from the first pair of delayed sound signals in a first proportion depending on the reference position and the target position so as to produce a first output sound signal having a delay, and adding up the first delayed signal and the second delayed signal from the second pair of delayed sound signals in a second proportion so as to produce a second output sound signal having a delay.

10. The sound reproduction apparatus according to claim 9, further comprising compensating means for compensating frequency characteristic changes in the first output sound signal and the second output sound signal caused in an adding process executed by said adding means.

11. The sound reproduction apparatus according to claim 9, wherein said adding means varies said first proportion and said second proportion when said reference position is changed.

12. The sound reproduction apparatus according to claim 9, further comprising level difference adding means for adding a sound level difference between said first processed sound signal and said second processed sound signal, wherein said sound level difference is introduced by said level difference adding means by increasing the sound level of one said processed sound signal while reducing the sound level of the other said processed sound signal.

13. The sound reproduction apparatus according to claim 9, wherein said signal processing means comprises filtering means for filtering the input sound signal to localize the sound image of the input sound signal in said reference position, said filtering means executing the step of convoluting, on the input sound signal, impulse responses corresponding to head related transfer functions from the sound image localized in said reference position to left and right ears of a listener.

14. The sound reproduction apparatus according to claim 9, further comprising rotational angle detecting means for detecting a rotational angle of a listener's head, wherein said target position is decided in accordance with an output signal of said rotational angle detecting means.

15. The sound reproduction apparatus according to claim 9, further comprising selecting means for selecting said first delayed signal from the first set of delayed sound signals that is delayed by a first delay time and selecting said second delayed signal from the first set of delayed sound signals that is delayed by a second delay time that is different from said first delay time of said first delayed signal of said first set of delayed sound signals so as to form said first pair of delayed sound signals; and selecting said first delayed signal from the second set of delayed sound signals that is delayed by a first delay time and selecting said second delayed signal from the second set of delayed sound signals that is delayed by a second delay time that is different from said first delay time of said first delayed signal of said second set of delayed sound signals so as to form said second pair of delayed sound signals.

16. The sound reproduction apparatus according to claim 9, wherein the delay of the first output sound signal and the delay of the second output signal vary in an inversely complementary manner depending on the reference position and the target position, such that when the delay of the first output signal increases, the delay of the second output signal decreases.

17. A sound signal processing method comprising:

executing signal processing on an input sound signal to produce a set of filtered left sound signals and a set of filtered right sound signals;

selecting a first filtered left signal and a second filtered left signal from the set of filtered left sound signals depending on a reference position and a target position in which a sound image is to be localized so as to form a left pair of filtered sound signals, and selecting a first filtered right signal and a second filtered right signal from the set of filtered right sound signals depending on said reference position and said target position so as to form. a right pair of filtered sound signals; and adding up the first filtered left signal and the second filtered left signal from the left pair of filtered sound signals in a first proportion depending on the reference position and the target position so as to produce a left output sound signal, and adding up the first filtered right signal and the second filtered right signal from the right pair of filtered sound signals in a second proportion depending on the reference position and the target position so as to produce a right output sound signal, wherein said step of executing signal processing on an input sound signal to produce a set of filtered left sound signals further comprises the step of convoluting, on the input sound signal, a plurality of left impulse responses, each of said left impulse responses corresponding to a head related transfer function from a sound source to a distinct, rotational angle of a left ear of a listener, and wherein said step of executing signal processing on an input sound signal to produce a set of filtered right sound signals further comprises convoluting, on the input sound signal, a plurality of right impulse responses, each of said right impulse responses corresponding to a head related transfer function from the sound source to a distinct rotational angle of a right ear of said listener.

18. A sound signal processing apparatus comprising:

signal processing means for executing signal processing on an input sound signal to produce a set of filtered left sound signals and a set of filtered right sound signals;

selecting means for selecting a first filtered left signal and a second filtered left signal from the set of filtered left sound signals depending on a reference position and a target position in which a sound image is to be localized so as to form a left pair of filtered sound signals, and selecting a first filtered right signal and a second filtered right signal from the set of filtered right sound signals depending on said reference position and said target position so as to form a right pair of filtered sound signals; and adding means for adding up the first filtered left signal and the second filtered left signal from the left pair of filtered sound signals in a first proportion depending on the reference position and the target position so as to produce a left output sound signal, and adding up the first filtered right signal and the second filtered right signal from the right pair of filtered sound signals in a second proportion depending on the reference position and the target position so as to produce a right output sound signal, wherein said signal processing means for executing signal processing to produce a set of filtered left sound signals further comprises convoluting means for convoluting, on the input sound signal, a plurality of left impulse responses, each of said left impulse responses corresponding to a head related transfer function from a sound source to a distinct rotational angle of a left ear of a listener, and wherein said signal processing means for executing signal processing on an input sound signal to produce a set of filtered right sound signals further comprises convoluting means for convoluting, on the input sound signal, a plurality of right impulse responses, each of said right impulse responses corresponding to a head related transfer function from the sound source to a distinct rotational angle of a right ear of said listener.

* * * * *